C. A. WINN.
ROLLER BEARING.
APPLICATION FILED OCT. 22, 1917.
1,849,307.
Patented Aug. 10, 1920.
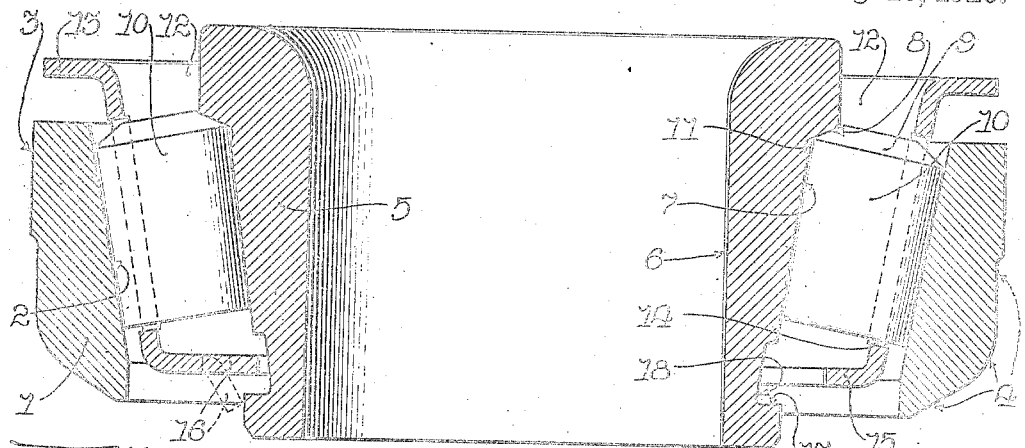
Fig. 1
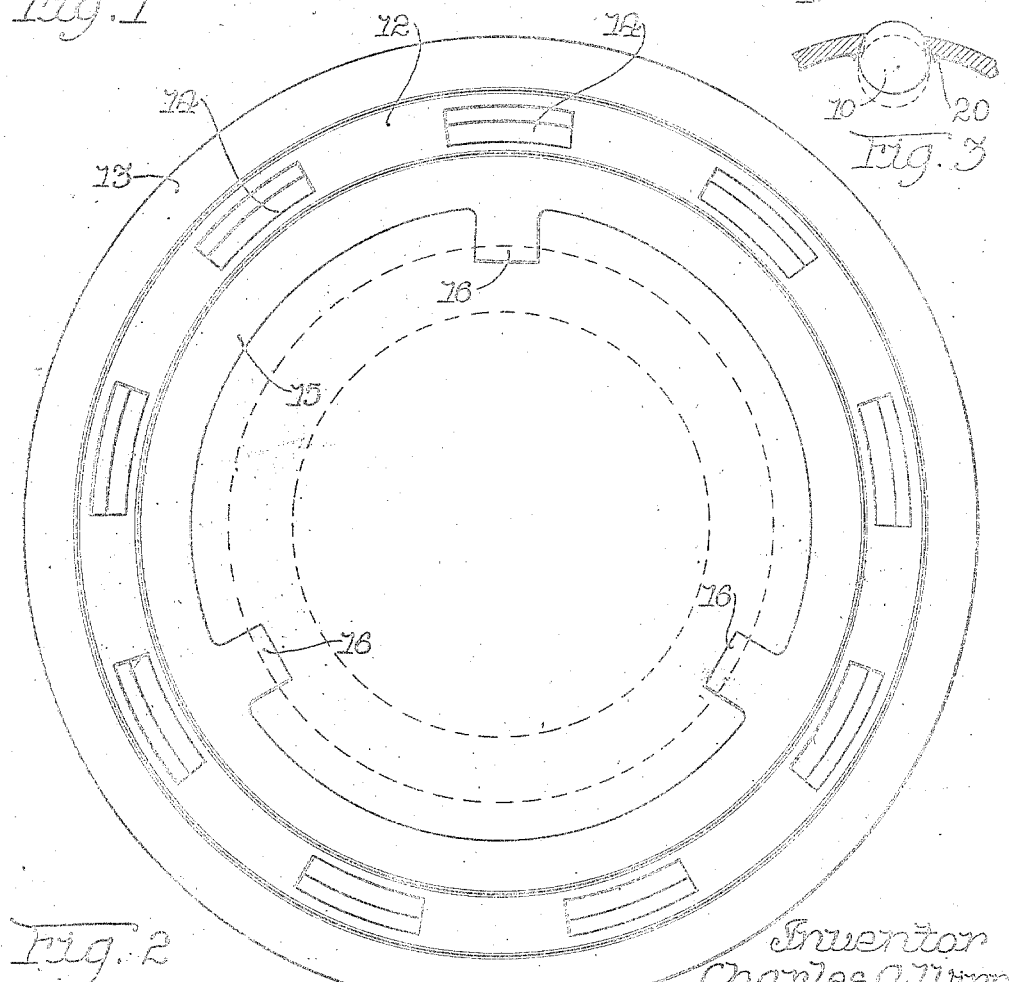
Fig. 2
Fig. 3
Inventor
Charles A. Winn
By Brown, Winson & Boettcher
Attorneys

UNITED STATES PATENT OFFICE.

CHARLES A. WINN, OF CHICAGO, ILLINOIS, ASSIGNOR TO CHICAGO BEARINGS COMPANY, OF CHICAGO, ILLINOIS, A CORPORATION OF ILLINOIS.

ROLLER-BEARING.

1,349,307.   Specification of Letters Patent.   Patented Aug. 10, 1920.

Application filed October 22, 1917. Serial No. 197,806.

*To all whom it may concern:*

Be it known that I, CHARLES A. WINN, a citizen of the United States, residing at Chicago, in the county of Cook and State of Illinois, have invented a certain new and useful Improvement in Roller-Bearings, of which the following is a full, clear, concise, and exact description, reference being had to the accompanying drawings, forming a part of this specification.

My invention relates to roller bearings and is concerned particularly with the manner of supporting and guiding the rollers upon the bearing surfaces or races.

According to the preferred form of my invention the rollers are supported in a cage and held upon one of the races by a plurality of radial arms struck up from the edge of the cage. These radial arms engage a peripheral shoulder formed upon the end of the race. It is immaterial upon which race or upon which end of the particular race the shoulder is formed. The cage is preferably not supported upon the race, but upon the rollers themselves, and is prevented from coming off of the race axially by the peripheral shoulder.

The cage is formed of a single piece of sheet metal suitably formed and slotted to receive the bearings. The slots are of a size less than the diameter of the bearings or rollers so that the edges of the slots may rest upon the outer half of the rollers in each case to support the cage upon the rollers and to support the rollers upon the races.

As the cage engages the outer half of the rollers, greater leverage for holding the rollers properly in position and for holding them against improper movement is provided.

While in the preferred embodiment which I shall hereinafter illustrate and describe, the cage rests upon the outer halves of the roller bearings and holds the rollers against the inner race, it is to be understood that the reverse relation may be employed for holding the rollers upon the outer race.

In the accompanying drawings which form a part of the present specification—

Figure 1 is a diametrical cross section of a bearing embodying my invention;

Fig. 2 is a front elevational view of the cage as viewed from the left of Fig. 1; and Fig. 3 is a fragmentary section of a modification.

The outer bearing 1, generally designated the cup, is provided with an inner conical ground surface 2 called the race. This outer bearing may be constructed in accordance with my invention set out in application Serial No. 163,768, filed April 23rd, 1917, or may be constructed in any other preferred form.

The outer surface 3 of the race is ground off to be strictly concentric with the inner surface 2 to provide a true bearing. The surface 4 is not ground but is relieved and in the process of manufacture forms a gripping surface in which the cup is chucked for grinding. The configuration of the outer surface forms no part of the present invention, however.

The inner bearing 5, generally termed the cone, is provided with a cylindrical inner surface 6 for attachment to a shaft or the like and is provided on its outer surface with the conical ground surface 7 termed a race. A sloping peripheral shoulder 8 is formed adjacent the larger end of the race 7 which is adapted to bear against the conical ends 9 of the rollers 10 to prevent axial movement of the same. The surface 8 is carefully ground as is the surface 7, these two surfaces being separated by a relief or groove as it is impractical or undesirable to grind a sharp corner where these two surfaces join. The rollers 10, while apparently cylindrical, are in fact conical on a taper of about 3½ degrees. The taper is such that the rollers tend to force themselves against the shoulders 8 and thus are substantially self-supporting and guiding so long as the cup and cone are in proper relation to each other. The rollers 10 are held upon the cone 5 by means of the cage 12. The cage comprises a frusto-conical ring of sheet metal having a radially extending flange 13 flaring outward from its larger end for stiffening purposes. The side walls of the cage are slotted as indicated at 14, the slots being of a length slightly greater than the overall length of the rollers 10. The width of the slots is less than the diameter of the rollers so that the edges of the slot which are cut parallel with the sides of the rollers rest upon the outer halves of the respective rollers. The smaller end of the conical shell or cage 12 has an inturned radial flange 15 provided mainly for stiffening purposes. From the edges of the flange 15 three arms 16 extend inwardly, these arms being adapted to hold the cage and the rollers upon the cone 5 as will be described hereafter. The flange may be dispensed with and the arms 16 may depend from the body of the cage.

The cone 5 is provided at its smaller end with a peripheral shoulder 17 between which and the ground surface or race 7 is formed an unfinished groove 18 for relief in grinding. The radial arms 16 extend into the groove 18 but preferably do not contact with the bottom thereof as the cage is supported upon the rollers 10. When the cage is put in place the arms 16 are sprung over the shoulder 17, being forced on by pressure. This is accomplished preferably by bending the legs 16 individually as shown in dotted lines in Fig. 1 and then pressing a die against the legs and straightening them all simultaneously. As the sole purpose of the cage 12 is to guide the rollers 10 and to hold them upon the cone 5 when the bearings are separated, it is apparent that the arms 16 need not be made very heavy as they are subjected only to small stresses.

The tightness of the bearing may be adjusted by bending the arms 16 to secure the proper position of the rollers upon the bearings.

The shoulder 17 instead of being formed by an outwardly extending collar, may consist of the side of a groove let into the cone without departing from my invention.

In Fig. 3 I have illustrated the manner in which the edges of the slots of the cage are formed when the rollers are relatively small. When the rollers are large the thickness of the cage is immaterial but when the thickness of the cage is large with respect to the radius of the rollers it is advantageous to form the edges of the roller retaining slots.

As shown in dotted lines in Fig. 3 the slots in the cage are first punched out square and of a size such that the roller will not project through sufficiently far to reach the race. The edges of the slots are then swaged back as shown at 20 giving the walls a slope which permits the rollers to project through the slots sufficiently to engage both races but at the same time be securely held within the cage.

The arms 16 instead of being bent from the rear edge of the cage may be struck out of the body of the cage and extend down into a groove in the body of the cone below the flange 13.

Mounting the cage upon the outer halves of the bearings gives the cage greater leverage for keeping the rollers in proper alinement and prevents any possibility of the rollers climbing over the cage. Very little friction is presented as the cage normally has no other work to perform than support itself upon the rollers.

The simplicity and ease of manufacture is striking.

I do not intend to be limited to the precise details of construction shown.

I claim:

1. In combination, a bearing member having a tapered race, an inner peripheral shoulder adjacent the smaller end of said race, a series of tapered rollers for said race and a sheet metal cage having a series of openings therein of less diameter than the rollers, said cage resting upon the rollers with the edges of the openings upon the outer halves of the rollers, said cage having a plurality of inwardly projecting members adapted to be caught back of the shoulder, said members preventing axial removal of the cage from the bearing.

2. In combination, a bearing cone having a race, a peripheral shoulder adjacent said race, a series of frusto conical rollers upon said race, and a frusto conical sheet metal ring having slots therein, said slots being in width smaller than the corresponding diameter of the rollers, and having their edges resting upon said rollers to support the cage upon the rollers, a relief groove being formed upon said cone between the shoulder and the race and projections from the cage disposed in said relief groove but out of contact with the same, back of said shoulder to prevent axial displacement of the ring and bearings on the cone.

3. In combination, a cone having a bearing race, said race comprising a conical surface adapted to support lateral pressure and having a conical surface adapted to receive the end thrust of the rollers in one direction, tapered rollers for said race and a cage for said rollers, said cage comprising a sheet metal ring having openings therein of less diameter than the rollers, the edges of said openings having contact with the outer halves of the rollers, a peripheral shoulder on the cone and a plurality of projections extending inward from said cage, said projections being normally out of contact with the cone but being disposed back of said shoulders to limit axial movement of the cage with respect to the cone.

4. In combination, a tapered bearing, tapered rollers for the bearing, an inner peripheral shoulder adjacent the smaller end of the bearing, and a cage carried on the rollers having a plurality of integral fingers therewith adapted to be formed to engage an inner edge of said shoulder for holding the rollers on the bearing.

5. In combination, a series of tapered rollers having conical end faces at one end only, an inner bearing member having a tapered bearing race upon which the rollers are adapted to run, a coöperating outer bearing member comprising a ring having a tapered bearing race adapted to bear upon the rollers, one of said bearing members having an annular shoulder adapted to engage the conical end faces of the rollers to withstand the endwise thrust of the rollers in one direction, and a cage for the rollers, said cage comprising a tapered annular sheet metal ring having openings therein of less diameter than the rollers, one of said bearing members having an annular shoulder, said ring having laterally extending arms engaging a back surface of said annular shoulder to prevent axial movement of the cage with respect to the bearing member.

6. In combination, a series of tapered rollers, each roller having a larger end thereof formed with a conical face, an inner bearing member having a tapered bearing race upon which the rollers run, an annular shoulder at the larger end of the tapered race, against which the conical end faces of the rollers are adapted to engage to sustain the end thrust in that direction, a retaining shoulder at the other end of the race and a retaining ring for the rollers having a plurality of flexible arms extending inwardly and lying back of the retaining shoulder to retain the rollers on said bearing member.

7. In combination, a tapered bearing, tapered rollers for the bearing, an inner peripheral shoulder at the smaller end of the bearing, and a cage carried on the rollers, said cage having several inwardly extending projections adapted to project within the outer periphery of said shoulder to hold the cage and rollers on the bearing and adapted to be bent relatively to the body of the cage to engage said shoulder for properly positioning the rollers on the bearing.

8. In combination, a tapered bearing tapered rollers for the bearing, said bearing having an annular groove at one end, a cage for the rollers, and several fingers integral with the cage extending within said groove and engaging either wall thereof for holding the cage and rollers against removal from the small end of the bearing.

9. In combination, a tapered bearing, tapered rollers for the bearing, a sheet metal cage for the rollers, the bearing being provided with a circumferential groove, said cage having a plurality of inwardly directed integral fingers disposed within said groove for retaining the rollers and cage on the bearing.

10. In a roller bearing, an inner tapered race ring, tapered rollers on the ring, a sheet metal cage for the rollers, said race ring having a circumferential groove at one end, one end of said cage having several fingers formed for extending within said groove to hold the rollers and cage against removal from the race ring.

11. In a roller bearing, an inner coned race ring, tapered rollers on the race ring, a circumferential shoulder on the race ring at the larger ends of the rollers adapted to engage the said larger ends to withstand end thrust, and a cage carried on the rollers having several fingers for extending within a groove in engagement with the race ring for holding the rollers and the cage against removal from the race ring.

12. In a combined thrust and radial bearing, an inner tapered race ring, tapered rollers on the ring, the larger ends of the rollers arranged at the larger end of the ring, a circumferential shoulder on the ring inclined outwardly from the larger end of the ring, the larger ends of the rollers conformed to said shoulder and adapted to engage same to resist thrust in one direction, and a sheet metal cage having slots for receiving the rollers and having inwardly directed radial fingers for engaging said race ring to retain the cage and rollers against removal from the ring toward the small end thereof.

13. In combination, a tapered cone bearing, tapered rollers for the bearing, the bearing having an outer peripheral groove near the smaller end thereof, and a sheet metal cage carried by the rollers, said cage having integral radial tongues adapted to be bent to extend inwardly within said groove to engage either wall thereof for holding the cage and the rollers upon the bearing.

In witness whereof I hereunto subscribe my name this 16th day of October, A. D. 1917.

CHARLES A. WINN.